Figure 1:
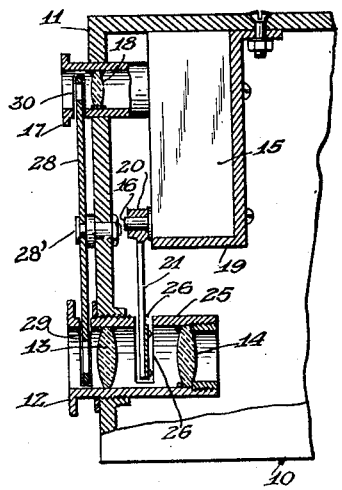

Oct. 27, 1936.　　　G. BUCKY ET AL　　　2,058,562

LIGHT INTENSITY SELF ADJUSTING CAMERA

Filed Dec. 11, 1935

INVENTORS
Gustav Bucky
Albert Einstein
by Walter S. Blustin
ATTORNEY.

Patented Oct. 27, 1936

2,058,562

UNITED STATES PATENT OFFICE 2,058,562

LIGHT INTENSITY SELF-ADJUSTING CAMERA

Gustav Bucky, New York, N. Y., and Albert Einstein, Princeton, N. J.

Application December 11, 1935, Serial No. 53,884

9 Claims. (Cl. 95—10)

This invention relates to a camera with a device for automatically adjusting the light intensity, and an object of the invention is to provide means for automatically adapting the light impinging the photographic plate or film of the camera to the light intensity of the surroundings and particularly of the object to be photographed.

A further object of the invention is to provide means for an automatic adjustment of the light intensity without necessitating the use of a power source which may be due to get exhausted after a certain length of time, like an electric battery.

The invention consists in the combination of a camera with a photo-electric cell and a screen of varying penetrability to light, said screen being movable in the path of the light rays passing the camera objective.

Figure 2:
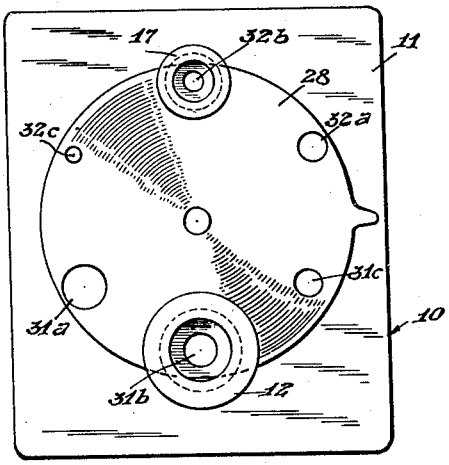
Figure 4:
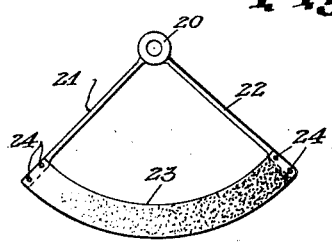
Figure 3:
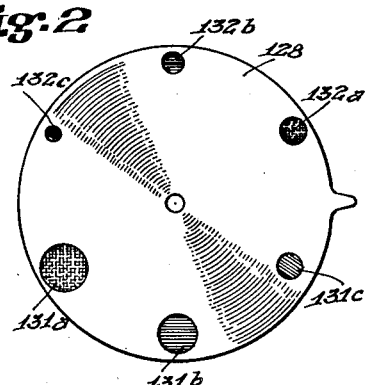

Further objects, features and details will be apparent from the following description and the accompanying drawing illustrating an embodiment of the invention. In the drawing are:

Fig. 1 a side elevation of a portion of a camera as per the invention, partly in section, Fig. 2 a front elevation of the camera, Fig. 3 a front elevation of a modified part, Fig. 4 an elevation of the screen.

Referring now to the figures, 10 is a camera having a front wall 11, which carries the photographic objective 12 with lenses 13 and 14. In the interior of the camera 10, a photo-electric cell forming a unit 15 together with a mechanism for turning a shaft is mounted and secured to the camera by suitable means, as for instance by means of a bracket 19. Such photo-electric cell with the mentioned mechanism for turning a shaft, which may be for instance a mechanism as conventional in a millivoltmeter, is a well-known unit available on the market and is used in exposure meters where the shaft carries a pointer for indicating the correct length of exposure, as for instance the "Weston Photronic photo-electric cell". This photo-electric cell unit 15 per se does not form part of the present invention and is therefore shown merely in its outlines. 16 is the shaft adapted to be actuated by said photo-electric cell unit. The unit 15 receives light through a tubular fixture 17 in front wall 11 with or without the help of a lens 18 in the aperture of fixture 17. With shaft 16, a member 20 is rigidly connected, which comprises two radial arms 21 and 22. A screen 23 having the shape of a ring segment is stretched between the ends of arms 21 and 22 and secured to these arms for instance by means of rivets 24. Screen 23 is made of a transparent, preferably of a celluloid-like material. The transparency of the screen is decreased from one end to the other, from its maximum to a minimum. This is done by shading it from clear over gray to black as indicated in Fig. 4. This screen is so arranged that it may swing in the path of the light rays passing through objective 12, and it is furthermore so arranged that the screen portion with maximum transparency is in the path of the rays when the photo-electric cell is not or only very little energized, that means when the light intensity is weakest. The plane in which the screen intersects these light rays is immaterial. We, however, prefer to position the screen between the lenses 13 and 14 for which purpose the objective tube 25 is slitted at 26, because the coincidence of the rays in the space between the lenses permits the screen to be made very narrow. This is important because the movable parts in connection with unit 15 should be made as light as possible in consideration of the very small power output of a photo-electric cell. It is, however, within the scope of this invention to use another kind of photo-sensitive cells as for instance a selenium cell with a battery.

It will be understood that the camera according to our invention may be equipped with any conventional accessorial parts as for instance a shutter, omitted in the drawing in order to avoid overcrowding of lines.

If now the camera is directed with its objective 12 upon the object to be photographed, the aperture or light entrance tube 17 of the photo-electric unit is directed likewise. The light intensity striking the photo-electric unit creates a power which turns the shaft 16 through an angle which is a function of the light intensity. Consequently, the screen 23, is swung between lenses 13 and 14 in such a position that the light impinging the photographic plate or film is adjusted in correspondence with the light entering the photo-electric unit. It is obvious that the increment of alteration of the transparency has to be so chosen from the start, that it corresponds with the angles through which the shaft 16 is turned due to the light intensity, and that it also corresponds with the light desired to impinge the photographic plate.

If a camera is equipped with the device as described, no iris for light reduction is required. In many instances, however, it may be desirable to have different diaphragms or a variable diaphragm for the objective in the conventional manner, and to use the automatic adjuster only for taking care of such alterations of the light which occur after the camera has been set for taking a photograph with a definite shutter speed. This may be the case particularly with cinematographic cameras. It also may be desirable to voluntarily alter the aperture of the objective in correspondence with the sensitivity of the emulsion of the film or plate used in each particular case. If, however, the aperture of the objective is variable in a voluntary manner, the self-adjusting device may not always produce proper correction for the alterations of the light. In order to overcome such drawbacks, we provide means for simultaneously and proportionally altering the aperture of the objective and the aperture through which the light enters the photo-electric cell. In Figs. 1 and 2 a very simple arrangement of this kind is illustrated. A disc 28 is pivotally mounted at 28' on the front wall 11, between the objective 12 and the tube 17. Objective 12 and tube 17 are slitted at 29 and 30 respectively and the disc 28 passes through such slits. Disc 28 is provided with a set of holes 31a, 31b and 31c of different sizes and with a second set of holes 32a, 32b and 32c, which are so arranged that hole 31a is in front of objective 12 when hole 32a is in front of tube 17. The same relation exists with regards to holes 31b and 32b and holes 31c and 32c. The sizes of these sets of holes are so chosen that the second one is adapted to change the aperture of tubular fixture 17 in the same proportion as the first set is adapted to change the aperture of the objective 12. Thus the unit 15 receives light only in correspondence with the light of the objective and may now properly correct the light impinging the photographic plate. In a similar manner, when using a filter for the objective, a filter of equal quality should be used for the light entrance to the photo-electric cell. In such a case a disc 128 may be provided or substituted for disc 28, which contains corresponding sets of holes, 131a, b, c and 132a, b, c, filled with filter substances, such as for instance colored glass. The holes of one set may then be of equal size, but the filter substances of the holes of each of the sets may be of different filtering qualities, or they may be of different size as shown.

Although a particular embodiment of the invention has been illustrated and described herein, it will be obvious to those skilled in the art, that various modifications may be made in the details of the construction without departing from the principle herewith set forth.

We claim:

1. In combination with a camera having an objective, a shaft, and a photo-electric cell unit including a drive for oscillating said shaft in correspondence with the variation of the light impinging the photo-electric cell, a ring segment shaped screen of a transparency decreasing from one of its ends to the other end, rigidly connected with said shaft and adapted to swing in the path of the light rays passing said objective.

2. In combination with a camera having an objective, a shaft, and a photo-electric cell unit including a drive for oscillating said shaft in correspondence with the variation of the light impinging the photo-electric cell, a ring segment shaped screen of a transparency decreasing from one of its ends to the other end, and a two-armed screen carrier rigidly connected with said shaft, said screen stretched between the ends of said carrier arms and adapted to swing in the path of the light rays passing said objective.

3. In a combination as claimed in claim 2, said screen being of transparent material increasingly darkened from its one end to the other end.

4. A camera comprising an objective including a first lens, a second lens and a tubular mount for said lenses; a shaft, a photo-electric cell unit including a drive for oscillating said shaft in correspondence with the variation of the light impinging the photo-electric cell, a segment shaped screen of a transparency decreasing from one of its ends to the other end and rigidly connected with said shaft, and a slit in said tubular mount between said first and said second lens, said screen being adapted to swing within said slit.

5. In a camera having a front wall, an objective in said front wall, a shaft, a photo-electric cell unit, means in the camera front wall for admitting light to said photo-electric cell unit, said unit including a drive for oscillating said shaft in correspondence with the variation of the light impinging the photo-electric cell, a segment shaped screen of a transparency decreasing from one of its ends to the other end, rigidly connected with said shaft and adapted to swing in the path of the light rays, passing said objective and manually operated means for simultaneously altering the aperture of said objective and the aperture of said light admitting means.

6. In a camera having a front wall, an objective in said front wall, a shaft, a photo-electric cell unit, means in the camera front wall for admitting light to said photo-electric cell unit, said unit including a drive for oscillating said shaft in correspondence with the variation of the light impinging the photo-electric cell, a segment shaped screen of a perviousness to light decreasing from one of its ends to the other end, rigidly connected with said shaft and adapted to swing in the path of the light rays passing said objective, and manually operated light filtering means adapted to equally and simultaneously alter the quality of the light rays passing said objective and said light admitting means.

7. In a camera having an objective, a photo-electric cell unit, two screens of a transparency decreasing from one screen end to the other end, said screens being arranged one in front of the other one, the end with greatest transparency of one screen towards the one side and that of the other screen towards the other side, said screens being movable in the path of the light rays passing said objective, and means under the control of said photo-electric cell unit for moving said screens simultaneously equal distances in opposite directions.

8. In a camera having an objective, a photo-electric cell unit, a screen of a transparency decreasing from one of its ends to the other end, said screen being movable in the path of the light rays passing through said objective, and means under the control of said photo-electric cell unit for moving said screen in response to the prevailing light conditions whereby the transparency of the screen area in the path of the light rays passing the objective decreases when the light impinging said cell unit increases from a minimum to a maximum.

9. In a camera having a front wall, an objective in said front wall, a shaft, a photo-electric cell unit, means in the camera front wall for admitting light to said photo-electric cell unit, said unit including a drive for oscillating said shaft in correspondence with the variation of the light impinging the photo-electric cell, a segment shaped screen of a perviousness to light decreasing from one of its ends to the other end, rigidly connected with said shaft and adapted to swing in the path of the light rays passing said objective, manually operated means for simultaneously altering the aperture of said objective and the aperture of said light admitting means, and light filtering means for equally and simultaneously altering the quality of the light rays passing said objective and said light admitting means.

GUSTAV BUCKY.
ALBERT EINSTEIN.